United States Patent [19]

Rauhut

[11] 3,718,599
[45] Feb. 27, 1973

[54] STABILIZATION OF OXALATE ESTER SOLUTIONS DURING STORAGE

[75] Inventor: Michael McKay Rauhut, Norwalk, Conn.

[73] Assignee: American Cyanamid Company, Stamford, Conn.

[22] Filed: June 29, 1970

[21] Appl. No.: 56,084

[52] U.S. Cl. .............252/188.3, 252/186, 252/397, 252/407
[51] Int. Cl. ...............................................C09k 3/00
[58] Field of Search...........................252/188.3, 186

[56] References Cited
FOREIGN PATENTS OR APPLICATIONS 902,128  1/1954  Germany
1,041,770 10/1958 Germany Primary Examiner—John D. Welsh
Attorney—Charles J. Fickey

[57] ABSTRACT

This invention relates to a means and method for improving the storage stability of a chemiluminescent reaction component comprising an oxalic-type compound in a solvent, by adding a weak acid thereto, said reaction component being capable of providing chemiluminescent light on admixture with a hydroperoxide compound in the presence of a fluorescer.

8 Claims, No Drawings

STABILIZATION OF OXALATE ESTER SOLUTIONS DURING STORAGE

This invention relates to chemiluminescent compositions and a method for obtaining chemiluminescent light, i.e., radiation of a wavelength, between 330 and 1,000 millimicrons. It more particularly relates to a method and means for improving the storage stability of chemiluminescent compounds.

Chemiluminescent light can be obtained by reacting certain chemiluminescent compounds, for example, oxalic-type-compounds such as oxalic-type anhydrides, oxalic-type amides, oxalic-type O-acylhydroxyl-amines and oxalic-type esters with a hydroperoxide compound in the presence of a solvent and a fluorescer, such as disclosed, for example, in copending, commonly assigned applications Ser. Nos. 425,599 now abandoned; 520,052; 547,782; 547,761; and 491,896 now abandoned now U.S. Pat. No. 3,442,815.

In order for such chemiluminescent systems to have practical use, it should be possible to store the above oxalic-type compounds without undue decomposition occurring.

It is therefore an object of this invention to provide a method and means for providing a storage-stable chemiluminescent system.

A further object is to provide a chemiluminescent compound mixture which is storage stable.

An additional object is to provide a chemiluminescent compound mixture which is efficient in chemiluminescent light production after periods of storage.

These and other objects of the invention will become apparent as the description thereof proceeds.

The term "chemiluminescent reaction component," as used herein, means a mixture which will result in a chemiluminescent reaction (1) when reacted with other necessary reactants in the processes as disclosed herein, or (2) when brought into the proper physical environment.

A "chemiluminescent reactant" is any compound which enters into a chemical reaction whereby chemiluminescent light is obtained.

The term "chemiluminescent composition", as used herein, means a mixture which will result in chemiluminescence.

The term "admixing", as used herein, means "reacting" or sufficiently bringing together component reactants to obtain a chemiluminescent reaction.

The term "hydroperoxide compound" as used herein is limited to peroxide compounds having at least one HOO— group, or a compound which upon reaction produces a compound with such a group.

The term "peroxide compound," as used herein, also includes compounds which upon reaction produce the peroxide group.

The term "hydrogen peroxide compound" includes (1) hydrogen peroxide and (2) hydrogen peroxide-producing compounds.

The term "fluorescent compound," as used herein, means a compound which fluoresces in a chemiluminescent reaction, or a compound which produces a fluorescent compound in a chemiluminescent reaction.

The term "diluent," as used herein, means a solvent or a vehicle which when employed with a solvent does not cause insolubility.

The chemiluminescent light is obtained in this invention by the reaction of the hydroperoxide with a chemiluminescent composition which, in combination, comprises a chemiluminescent compound selected from the group consisting of (1) an oxalic-type anhydride of the type disclosed and claimed in a copending application, U.S. Ser. No. 425,599, which is hereby incorporated by reference, (2) an oxalic-type amide of the type disclosed and claimed in copending applications, U.S. Ser. Nos. 520,052 and 547,782, which are hereby incorporated by reference, (3) an oxalic-type O-acylhydroxylamine of the type disclosed and claimed in copending application, Ser. No. 547,761, and (4) an oxalic-type ester, application, Ser. No. 491,896, a fluorescer compound, and a solvent.

The general mechanism for the chemiluminescent reaction can be broken down into three steps.

1. Luminant + Oxidant → Key Intermediate
2. Key Intermediate + Fluorescer → Excited Singlet Fluorescer
3. Excited Singlet Fluorescer → Fluorescer + Radiation In step (1) a chemiluminescent material undergoes reaction, usually with an oxidant, to produce what I will call a key intermediate. In step (2) the key intermediate undergoes a decomposition or other reaction which produces a fluorescent compound in singlet excited step. In step (3) the excited singlet fluorescer emits radiation. The decomposition products are not shown. The exact nature of the key intermediate has not been determined.

It has been found that the above chemiluminescent compounds do not produce their optimum chemiluminescent light output if they are reacted after very long storage. It has been further found that the light output is higher after storage if a stability agent has been incorporated with the chemiluminescent compound. Such storage stability agents are acids in preferred concentrations of: 0.001 M – 0.05 M; optional concentrations of stabilizing acids can be in general: 0.0001 M – 5 M or higher.

In general, smaller concentrations of strong acids ($pKa < 3$) than weak acids are preferred. Thus, while the concentration of carbon dioxide (the $pKa$ for carbonic acid is 6.37) could be as high as 5 M or higher (in a pressurized vessel) a smaller concentration (0.0001 to 0.01 M) of sulfuric acid ($pKa = 1.92$) would normally be preferred.

Some suitable acids are, for example, as follows:

Stabilizing Acids

| Acid | pK |
| --- | --- |
| acetic | 4.75 |
| adipic | 4.43 |
| anesic | 4.47 |
| barbituric | 4.01 |
| benzoic | 4.19 |
| o-bromobenzoic | 2.84 |
| m-bromobenzoic | 3.86 |
| m-caproic | 4.83 |
| p-chlorobenzoic | 3.98 |
| p-chlorophenoxyacetic | 3.10 |
| α-chloropropionic | 2.83 |
| α-cyanobutyric | 2.42 |
| cyclohexane-1,1-dicarboxylic | 3.45 |
| 2,3-dichlorophenol | 7.45 |
| dimethylmalonic | 3.15 |
| formic | 3.75 |
| phenol | 9.89 |
| o-phthalic | 2.89 |

| | |
|---|---|
| trichlorophenol | 6.00 |
| carbonic | 6.37 |
| phosphoric | 2.12 |
| sulfuric | 1.92 |

The preferred combination of this invention employs an oxalic-type ester as the essential chemiluminescent ingredient of the novel combination of this invention, and accordingly the entire disclosure of copending application, Ser. No. 491,896, filed Sept. 30, 1965, is hereby incorporated by reference. Therefore, oxalic-type esters within the scope of this invention include esters of the following representative formula:

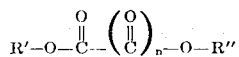

where R' or R'' is a negatively substituted alkyl group, such as 1,1,1,3,3,3-hexafluoro-2-propyl or substituted aryl groups such chlorophenyl-, chlorophyenyl-, benzolyloxyphenyl-, formylphenyl-, carboxyphenyl-, pyridylphenyl-, sulfophenyl-, heterocyclic groups such as pyridyl-, imidazolyl-, triazinyl-, acridinyl-, fural-, or substituted forms of heterocyclic groups such as methylpyridyl-, chloropyridyl-, acytoxypyridyl-, formyl-pyridyl-, carboxypyridyl-, for example, and unsaturated alkyl groups such as vinyl-, for example. Other representative oxalic-type esters of alcohols include compounds such as esters with diols, cyclic esters with diols such as nitrocatechol, polymeric esters with diols such as nitroresorcinol, esters with alcohols which are fluorescent, such as 2-naphthol-3,6,8-trisulfonic acid.

Once the unexpected superiority was discovered for the combination of this invention, which includes the oxalic-type ester chemiluminescent compound, it immediately became apparent to the inventor that because of similarity in the chemical mechanism of the reactions, the oxalic-type anhydrides, the oxalic-type amide, and the oxalic-type O-acylhydroxylamine of the types set forth in the above-cited copending applications, incorporated by reference, may be employed in substitution for the preferred oxalic-type ester.

The oxalic-type ester of this invention is preferably selected from the group consisting of (a) an ester of an oxalic-type acid and an alcohol characterized by acid ionization constant in water greater than $1.3 \times 10^{-10}$, and (b) a vinyl ester of an oxalic-type acid. Similarly, in a preferred embodiment thereof, the alcohol would be an aromatic alcohol substituted by a substituent characterized by a positive Hammett sigma value. The preferred species of oxalic-type esters include bis(substituted-phenyl)oxalate such as bis(2-nitrophenyl)-oxalate, bis(2,4-dinitrophenyl)oxalate bis(2,6-dichloro-4-nitrophenyl)oxalate, bis(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis( 2,5-dinitrophenyl)oxalate, bis(2-formyl-4-nitrophenyl)oxalate, bis(pentachlorophenyl)oxalate, bis(1,2-dihydro-2-oxo-1-pyridyl)-glyoxal, bis-N-phthalmidyl oxalate. The preferred sub-species is bis(2,4-dinitrophenyl)oxalate.

The peroxide employed in the compositions and process of this invention may be obtained from any suitable peroxide compound. For example, the peroxide may be employed as sodium peroxide. Alternatively, sodium perborate may be placed in aqueous solution whereby a solution of hydrogen peroxide is obtained. Obviously, hydrogen peroxide or its solution may be employed. Although the presence of water and/or base is critical in order to obtain the preferred optimum maximum-intensity chemiluminescence in certain embodiments of this invention, the peroxide employed may be obtained from anhydrous hydrogen peroxide compounds such as perhydrate of urea(urea peroxide), perhydrate of pyrophosphate (sodium pyrophosphate peroxide), perhydrate of histidine (histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc., of the type which would provide a suitable diluent for the composition of this invention. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-2}$ molar. The ester of this invention may be added as a solid or in admixture with a suitable solid peroxide reactant or in a suitable diluent, or alternatively disSolved directly in a solution containing the peroxide reactant.

Typical diluents, which additionally may be used in conjunction with the necessary diluent of this invention, are those which do not readily react with a peroxide such as hydrogen peroxide, and which do not react with an ester of oxalic acid.

Although the addition of water is not necessary for the production of chemiluminescent light in certain embodiments according to the present invention, water can serve as the diluent or partial diluent. The term "water," as used herein, includes water-producing compounds such as hydrates. In addition, however, either one or more diluents may be included with or in the place of the water as long as the peroxide employed is at least partially soluble in the diluent(s), such as, for example, at least one tenth gram of $H_2O_2$ per liter of diluent. The following are illustrative of the additional diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like.

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 1,000 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like subStituents which do not interfere with the light-generating reaction contemplated herein.

Numerous other fluorescent compounds having the properties given hereinabove are well known in the art. Many of these are fully described in "Fluorescence and Phosphoresence," by Peter Pringsheim, Interscience Publishers, Inc., New York, N. Y., 1949. Other fluorescers are described in "The Color Index," Second Edition, Volume 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, a fluorescent ester, such as the oxalic acid ester of 2-naphthol-3,6,8-trisulfonic acid, does not require a separate fluorescent compound to obtain light. Other typical fluorescent oxalic acid esters include esters of oxalic acid (1) 2-carboxyphenol, (2) 2-carboxy-6-hydroxyphenol, (3) 1,4-dihydroxy-9,10-diphenylanthracene, and (4) 2-naphthol. Thus, a reactant including a fluorescent oxalic-type ester would thereby include at least one fluorescent compound.

It has been found that the molar (moles per liter of diluent) concentrations of the major components of the novel composition herein described may vary considerably. It is only necessary that components be in sufficient concentration to obtain chemiluminescence. The ester of oxalic acid molar concentration normally is in the range of at least about $10^{-7}$ to 5 molar, preferably in the range of at least about $10^{-3}$ to about 1 molar; the fluorescent compound is present in the range from about $10^{-5}$ to 5, preferably $10^{-4}$ and $10^{-1}$ molar; and the water or other diluent must be present in a sufficient amount to form at least a partial solution of the reactants involved in the chemiluminescent reaction. If the ester is liquid, it may serve as either the sole diluent or a partial diluent.

The ingredients of the composition of this invention may be admixed in a single stage of admixing or in a sequence of steps of admixing the separate ingredients.

Although in the process of obtaining chemiluminescent light according to this invention, it is normally not necessary to employ a specific order of sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy.

The wavelength of the light emitted by chemiluminescence of the compositions of this invention, i.e., the color of the light emitted, may be varied by the addition of any one or more energy transfer agents (fluorescers) such as the known fluorescent compounds diScussed at length above.

The wavelength of the light emitted by the composition of this invention will vary, depending upon the particular fluorescent component employed in the reaction.

Additionally, it has been found that the superior intensity of chemiluminescence is obtained when the final mixture producing the luminescence is maintained at a temperature of between about −40°C. and 75°C., preferably between about 20°C. and 50°C. However, temperature is not critical and the luminescence of applicant's process is not limited to these ranges.

The composition and the process which obtains chemiluminescent light may be at an acidic pH. However, in view of the acid added for stability under storage, and the process is operable at the acid pH, this is not essential to obtain chemiluminescence, except with compounds of copending application, U. S. Ser. No. 547,782.

Thus, additionally, the composition and the process which obtains preferred optimum chemiluminescent light intensity can employ a base in an amount sufficient to produce a basic pH. However, the preferred extended lifetime is obtained under about neutral conditions. Any suitable base which does not interfere with the chemiluminescent composition and process of this invention may be employed. The base is maintained separate from the stored chemiluminescent compound and is added at the time of reaction with the hydroperoxide.

A wide variety of organic and inorganic bases is contemplated, typical bases being: sodium hydroxide, potassium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like; etc.

The lifetime and the intensity of the chemiluminescent light can be regulated by the use of certain regulators such as:

1. By the addition of base to the chemiluminescent composition. Both the strength and the concentration of the base are critical for purposes of regulation.
2. By the variation of hydroperoxide. Both the type and the concentration of hydroperoxide are critical for the purposes of regulation.
3. By the addition of water.
4. By the addition of a catalyst which changes the rate of reaction of hydroperoxide with the oxalic-type ester. Catalysts which accomplish that objective include those described in M.L. Bender, "Chem.Revs.," Vol.60, p.53 (1960). Also, catalysts which alter the rate of reaction or the rate of chemiluminescence include those accelerators of copending application, Ser. No. 577,595, and decelerators of copending application, Ser. No. 577,615.

MOre specifically, the advantages obtained by the corporation of a catalyst of Serial No. 577,595 may be obtained in conjunction with the objects of this present invention, by employing, according to the copending application, an ionized salt having a cation selected from (a) an organic quaternary cation selected from the group consisting of ammonium, arsenic, and phosphorous, and (b) alkali metal having an atomic weight above 22, the salt of said cation preferably being soluble in an organic solvent and preferably being characterized by a property of forming cation-aggregates when reacted with the oxalic-type ester and a hydroperoxide. One of the advantages is the fact that an excessive amount of the chemiluminescent agent may be employed whereby a higher quantum yield may be obtained when the ionized salt is employed, in contrast to systems not employing the accelerator whereby such systems would be limited to a much lower maximum concentration of chemiluminescent agent which would continue to increase rather than decrease the total quantum yield of chemiluminescent light.

Similarly, within the scope of the present invention is the concurrent employment of one or more decelerators either alone in the composition of this invention, or in conjunction with one or more of the accelerators discussed in the preceding paragraphs. By employing one of the accelerators of the preceding paragraph, it would be possible to employ a greater total concentration of the chemiluminescent agent while concurrently would be possible to employ a decelerator which would prolong the period during which the light of high intensity is obtained from the chemiluminescent reaction. Such decelerators set forth in the copending application, Ser. No. 577,615, include for example a compound such as oxalic acid.

Additionally, the invention may include the use of a gelling agent to provide a chemiluminescent composition of self-supporting structure as disclosed in copending application, Ser. No. 577,694.

The following examples are intended to illustrate the present invention and are in no way intended to limit the invention except to the extent that the appended claims are limited.

EXAMPLES 1–11

In these examples, the storage stability of bis(trifluoromethyl nitrophenyl)oxalate (TFMNPO) in various solvents and container materials was compared with and without a stability additive.

Solutions of TFMNPO were prepared in the various solvents and stored in various containers. One solution was saturated with carbon dioxide as a stabilizer and stored under carbon dioxide. Other solutions were stored identically under argon as controls. At weekly intervals, an aliquot from each pair was reacted under standardized conditions, as shown in Table I, with hydrogen peroxide and rubrene. The results are summarized in Table I, and show that higher quantum yields of light emission were obtained from the solutions stored with the stabilizer. It will be seen that the incorporation of a storage stability additive greatly enhances the storage stability of TFMNPO.

TABLE I

Storage Stability Experiment with bis(3-trifluoromethyl nitrophenyl)oxalate (TFMNPO) [a]

| Example | Solvent[b] | Container | Additive (conc. M) | | Storage time in weeks | | | | | |
|---|---|---|---|---|---|---|---|---|---|---|
| | | | | | 0 | 1 | 2 | 3 | 4 | 8 |
| 1 | DMP | Pyrex | None | Q | [c] 2.7 | [c] 3.2 | | | | |
| | | | | T¾L | [c] 188.7 | [c] 120.4 | | | | |
| 2 | DMP | do | Bu₄N⁺ClO₄⁻(0.02) | Q | [c] 7.5 | 14.4 | 12.7 | 10.6 | | 6.7 |
| | | | | T¾L | [c] 85.7 | 22.8 | 97.7 | 100.1 | | 83.4 |
| 3 | DMP | Polypropylene | None | Q | [c] 2.7 | [c] 5.8 | 2.9 | | | |
| | | | | T¾L | [c] 188.7 | [c] 414.5 | 169.0 | | | |
| 4 | TEP | Pyrex | do | Q | 18.1 | 13.1 | 7.8 | 5.6 | | |
| | | | | T¾L | 5.8 | 3.3 | 2.3 | 3.7 | | |
| 5 | TEP | Polypropylene | do | Q | 18.1 | 10.2 | 4.7 | | | .03 |
| | | | | T¾L | 5.8 | 3.0 | 1.3 | | | 7.4 |
| 6 | TEP | do | Bu₄N⁺ClO₄⁻(0.02) | Q | 16.1 | 7.3 | 4.7 | | | |
| | | | | T¾L | 3.1 | 2.0 | 3.2 | | | |
| 7 | TEP | do | Bu₄N⁺ClO₄⁻(0.02) | Q | 16.1 | 7.3 | 4.7 | | | |
| | | | | T¾L | 3.1 | 2.0 | 3.2 | | | |
| 8 | TEP | do | CO₂ (sat.) | Q | 17.8 | 16.5 | 15.8 | 14.0 | 13.5 | |
| | | | | T¾L | 4.1 | 6.7 | 12.9 | 12.6 | 25.1 | |
| 9 | TEP | Teflon | None | Q | 18.7 | 16.6 | 16.0 | 15.1 | 14.2 | 11.4 |
| | | | | T¾L | 16.1 | 95.2 | 36.7 | 87.1 | 64.6 | 70.3 |
| 10 | DME | Pyrex | do | Q | [c] 6.7 | [c] 4.0 | | | | |
| | | | | T¾L | [c] 23.6 | [c] 12.0 | | | | |
| 11 | DME | Polypropylene | do | Q | [c] 6.7 | [c] 7.3 | | | | |
| | | | | T¾L | [c] 23.6 | [c] 15.8 | | | | |

Notes to Table I
a. Solutions of 0.02 M TFMNPO in the indicated solvent stored at 25°C. Containers were washed well and shaken 48 hours with the reaction solvent prior to use. Chemiluminescent reactions were carried out with 0.01 M TFMNPO, 0.025 or $H_2O_2$ and $6 \times 10^{-4}$ M rubrene in the indicated solvent by diluting an aliquot of the stored TFMNPO with freshly prepared reagent solutions. The quantum yield is in units of einstein mole $\times 10^3$ based on starting oxalate concentration. The lifetime, T¾L, is in minutes required for three quarter of the total light to have been emitted.
b. DMP is dimethyl phthalate. TEP is triethyl phosphate. DME is 1,2-dimethoxyethane.
c. Fluorescer consumption was noted.

EXAMPLES 12–19

In these examples, the storage stability of bis-(2,4-dinitrophenyl)oxalate (DNPO), in various solvents and container materials was compared with and without a storage stability additive in a manner similar to the procedure followed in Examples 1 – 11. The additives used and the results are set forth in Table II. It is readily apparent that the incorporation of the inventive storage stability additive greatly enhances the storage stability of DNPO.

TABLE II

Storage stability experiments with bis(2,4-dinitrophenyl)oxalate (DNPO) [a]

| Example | Solvent [b] | Container | Stored additive (conc. M) | | Storage time in weeks | | | | | |
|---|---|---|---|---|---|---|---|---|---|---|
| | | | | | 0 | 1 | 2 | 3 | 4 | 8 |
| 12 | DMP | Pyrex | None | Q | 18.6 | 12.7 | 9.9 | 8.3 | 5.3 | 0.2 |
| | | | | T¾L | 3.3 | 2.8 | 3.3 | 3.9 | 3.8 | 3.7 |
| 13 | DMP | do | CO₂(sat.) | Q | 18.6 | 13.6 | 11.7 | 10.5 | 10.0 | 8.8 |
| | | | | T¾L | 3.5 | 3.1 | 2.6 | 2.4 | 2.7 | 3.1 |
| 14 | DMP | Polypropylene | None | Q | 18.6 | 15.3 | 14.2 | 14.4 | 12.8 | 8.4 |
| | | | | T¾L | 3.3 | 2.8 | 3.4 | 3.4 | 3.5 | 4.2 |
| 15 | DMP | Teflon | do | Q | 15.6 | | | 12.5 | 11.2 | |
| | | | | T¾L | 4.3 | | | 11.7 | 6.5 | |
| 16 | TEP | Pyrex | do | Q | 5.9 | 2.3 | 0.8 | 0 | | |
| | | | | T¾L | 21.8 | 31.0 | 22.6 | 0 | | |
| 17 | TEP | Polypropylene | do | Q | 5.9 | 0.2 | 0 | | | |
| | | | | T¾L | 21.8 | 39.1 | 0 | | | |
| 18 | DME | Pyrex | do | Q | 4.1 | 5.2 | 4.7 | 4.3 | 3.9 | |
| | | | | T¾L | 37.3 | 21.1 | 4.9 | 44.6 | 50.8 | |
| 19 | DME | Polypropylene | do | Q | 4.1 | 0 | | | | |
| | | | | T¾L | 37.3 | 0 | | | | |

Notes to Table II
Q = quantum yield × 10² based on starting oxalate concentration.
T¾L = Time in minutes requires for three quarter of the total light to have been emitted.
a Solution of 0.02 M DNPO in the indicated solvent stored at 25°C. Containers were washed well and shaken 48 hours with reaction solvent prior to use. Chemiluminescent reactions were carried out with 0.01 M DNPO, 0.025 M H₂O₂, and 6 × 10⁻⁴ M rubrene in the indicated solvent by diluting an aliquot of the stored DNPO solution with freshly prepared reagent solution. The quantum yield is in units of einstein mole⁻¹ × 10², and the lifetime, T¾L, is in minutes. b DMP is dimethyl phthalate TEP is triethyl phosphate DME is 1,2-dimethoxyethane.

While certain specific examples and preferred embodiments of the invention have been set forth, it will be understood that this is solely for illustration of the invention and that various changes and modifications may be made in the invention withOut departing from the spirit of the disclosure or the scope of the appended claims.

I claim:

1. A method for improving the storage stability of a chemiluminescent composition having the ingredients (1) an ester chemiluminescent compound of the formula:

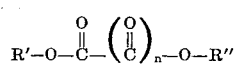

wherein R' and R'' are alkyl or aryl groups, $n$ is an integer at 1, and (2) an organic solvent, which comprises adding from 0.0001 to 5 M amount of an acid to said composition.

2. A composition according to claim 1 wherein said acid is carbonic acid.

3. A composition according to claim 1, in which the alcohol which forms said ester is an alcohol characterized by an acid ionization constant in water greater than $1.3 \times 10^{-10}$.

4. A composition according to claim 3 including in addition at least one organic fluorescent compound.

5. A composition according to claim 4, in which said alcohol is an aromatic alcohol substituted by a substituent characterized by a positive Hammett sigma value, and said fluorescent compound is rubrene.

6. A composition according to claim 5, in which said ester is a bis-ester of oxalic acid and a phenyl alcohol.

7. A composition according to claim 3 including at least an 0.005 M concentration of a quaternary ammonium or phosphonium salt which affects the rate of reaction of a hydroperoxide with an oxalic-type ester.

8. A process comprising reacting hydrogen peroxide with the composition of claim 4.

* * * * *